US009896060B2

(12) United States Patent
Koike et al.

(10) Patent No.: US 9,896,060 B2
(45) Date of Patent: Feb. 20, 2018

(54) WIRELESS SEATBELT ATTACHING DETECTION DEVICE

(71) Applicant: KABUSHIKI KAISHA TOKAI-RIKA-DENKI-SEISAKUSHO, Aichi (JP)

(72) Inventors: Tatsuya Koike, Aichi (JP); Hiroaki Iwashita, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 15/518,354

(22) PCT Filed: Oct. 2, 2015

(86) PCT No.: PCT/JP2015/078106
§ 371 (c)(1),
(2) Date: Apr. 11, 2017

(87) PCT Pub. No.: WO2016/059985
PCT Pub. Date: Apr. 21, 2016

(65) Prior Publication Data
US 2017/0305388 A1    Oct. 26, 2017

(30) Foreign Application Priority Data
Oct. 16, 2014  (JP) ................................ 2014-211773

(51) Int. Cl.
*B60R 22/48*      (2006.01)
(52) U.S. Cl.
CPC ...... *B60R 22/48* (2013.01); *B60R 2022/4816* (2013.01)

(58) Field of Classification Search
None
See application file for complete search history.

(56) References Cited

U.S. PATENT DOCUMENTS 4,667,336 A  *  5/1987  Best ........................ B60R 22/48
                                                  180/270
6,728,616 B1 *  4/2004  Tabe ..................... B60R 21/017
                                                  180/268
(Continued)

FOREIGN PATENT DOCUMENTS

JP    2008-238947 A    10/2008

OTHER PUBLICATIONS

International Search Report PCT/JP2015/078106 dated Dec. 8, 2015.

*Primary Examiner* — Fekadeselassie Girma
(74) *Attorney, Agent, or Firm* — Roberts Mlotkowski Safran Cole & Calderon P.C.

(57) ABSTRACT

There are provided a buckle switch that detects an insertion of a tongue into a buckle of a seatbelt and an ejection of the tongue from the buckle, a signal transmitting section that wirelessly transmits a signal showing a state of the buckle switch, and an attaching detection control unit that controls the signal transmitting section such that the signal transmitting section transmits different signals that correspond to a first time lasting from the insertion of the tongue into the buckle until the ejection of the tongue from the buckle or a second time lasting from the ejection of the tongue from the buckle until the insertion of the tongue into the buckle.

5 Claims, 9 Drawing Sheets

(56) References Cited

U.S. PATENT DOCUMENTS

| | | | |
|---|---|---|---|
| 8,063,788 B1* | 11/2011 | Morningstar | B60N 2/002 180/271 |
| 2006/0207074 A1* | 9/2006 | Takao | B60R 22/48 24/633 |
| 2008/0140278 A1* | 6/2008 | Breed | G06F 8/65 701/31.4 |
| 2009/0243367 A1* | 10/2009 | Tanaka | B60R 22/48 297/475 |
| 2015/0145666 A1* | 5/2015 | Sugawara | B60R 22/48 340/457.1 |
| 2016/0347278 A1* | 12/2016 | Bibbs, Jr. | B60Q 9/00 |
| 2017/0082447 A1* | 3/2017 | Ricci | G01C 21/3446 |
| 2017/0144626 A1* | 5/2017 | Demeritte | B60R 22/48 |
| 2017/0196371 A1* | 7/2017 | Liu | A47C 7/54 |

* cited by examiner

WIRELESS SEATBELT ATTACHING DETECTION DEVICE

CROSS-REFERENCE TO RELATED APPLICATIONS

The present application is a U.S. National Phase of PCT/JP2015/078106 filed on Oct. 2, 2015 claiming priority to Japanese Patent application No. 2014-211773 filed Oct. 16, 2014. The disclosure of the PCT Application is hereby incorporated by reference into the present Application.

TECHNICAL FIELD

The present invention relates to a wireless seatbelt attaching detection device that detects whether or not a seatbelt is attached.

BACKGROUND ART

A seatbelt reminder device is known that generates a warning when a seatbelt has not been attached. Among such seatbelt reminder devices are those that include a wireless seatbelt attaching detection device that detects whether or not a seatbelt is attached and wirelessly transmits the detection results. The technology described in Japanese Patent Application Laid-Open (JP-A) No. 2008-238947 has been proposed as a wireless seatbelt attaching detection device of this type.

In JP-A No. 2008-238947 there is proposed a device having a seatbelt that is placed in an attached state by firstly undergoing a preliminary operation that is performed prior to attaching and then undergoing a attaching operation, a first transmitter that wirelessly transmits a predetermined signal when the attaching operation is detected, a second transmitter that wirelessly transmits a predetermined signal when the preliminary operation is detected, a receiver that receives signals from the first transmitter and the second transmitter, and a control unit that determines the attached state of a seatbelt based on signals received by the receiver, wherein the receiver switches from an intermittent operating state to a continuous operating state as a result of receiving a signal from the second transmitter, and the control unit determines that the seatbelt is attached when the receiver receives a signal from the first transmitter after having received the signal from the second transmitter.

SUMMARY OF THE INVENTION

Technical Problem

However, in JP-A No. 2008-238947, because no consideration is given to there being plural seats, when the seatbelts of plural seats are attached, this may cause radio wave collision to occur, and there is room for improvement in seatbelt attaching detection.

The present invention was conceived in view of the above-described circumstances and it is an object thereof to provide a wireless seatbelt attaching detection device that is capable of reducing the probability of radio wave collision.

Solution to the Problem

In order to achieve the above-described object, a first aspect of the present invention is provided with a detecting section that detects an insertion of a tongue into a buckle of a seatbelt and an ejection of the tongue from the buckle, a transmitting section that wirelessly transmits a signal showing detection results from the detecting section, and a control unit that controls the transmitting section such that the transmitting section transmits different signals that correspond to at least one attaching/detaching time out of a first time lasting from the ejection until the insertion and a second time lasting from the insertion until the ejection.

According to the first aspect of the present invention, the insertion of a tongue into the buckle of a seatbelt, and the ejection of the tongue from the buckle are detected in the detecting section.

Signals showing detection results from the detecting section are transmitted by the transmitting section. Moreover, the transmitting section is controlled by the control unit such that the transmitting section transmits signals that differ in accordance with at least one attaching/detaching time out of a first time lasting from the ejection of the tongue from the buckle until the insertion of the tongue into the buckle, and a second time lasting from the insertion of the tongue into the buckle until the ejection of the tongue from the buckle.

It is also possible for the control unit to control the transmitting section such that, for example, as in a second aspect of the present invention, the transmitting section transmits signals whose lengths differ depending on whether the attaching/detaching time is shorter or longer than a predetermined time. Alternatively, as in a third aspect of the present invention, it is also possible for the control unit to control the transmitting section such that, when the attaching/detaching time is shorter than a predetermined time, the transmitting section transmits a shorter signal than when the attaching/detaching time is longer than the predetermined time.

In this manner, by transmitting signals that differ in accordance with the attaching/detaching time, it becomes possible to transmit signals whose length differs in accordance with the times of the tongue insertion and ejection. Because of this, it is possible to reduce the probability of radio wave collision with signals from a transmitting section which is transmitting detection results from another buckle.

Note that, as in a fourth aspect of the present invention, it is also possible for the control unit to control the transmitting section such that, when the attaching/detaching time is equal to or greater than a predetermined time, the transmitting section transmits a normal signal that includes a long frame in which the frames that include information showing the detection results are continuous with each other, and plural short frames which are shorter than the long frame, while when the attaching/detaching time is shorter than the predetermined time, the transmitting section transmits a signal that is made up of the normal signal from which the long frame has been omitted. Namely, because a signal that has been shortened by the amount of the omitted long frame can be transmitted, it is possible to reduce the probability of radio wave collision with signals from transmitting sections which are transmitting detection results from other buckles.

Moreover, as in a fifth aspect of the present invention, it is also possible for the control unit to control the transmitting section such that, when the second time is equal to or greater than a predetermined time, the transmitting section transmits a normal signal that includes a long frame in which plural the frames that include information showing the detection results are continuous with each other, and plural short frames which are shorter than the long frame, while when the second time is shorter than the predetermined time, the transmitting section transmits a signal having fewer shorter frames than the normal signal or from which the short frames have been omitted. Namely, by reducing or eliminating the number of times that short frames are transmitted, it is possible to reduce the probability of radio wave collision with signals from transmitting sections which are transmitting detection results from other buckles.

Moreover, as in a sixth aspect of the present invention, it is also possible for the control unit to control the transmitter such that the transmitter transmits a signal that is formed by plural frames that include information showing the detection results, and includes frames in which the signal strength of at least one frame out of the plurality of frames is greater than the signal strength of the other frames. As a consequence, because signals having a greater signal strength are received preferentially on the receiving side, the probability that signals will not be able to be received on the receiving side is reduced, and the probability of communication being established can be improved.

Advantageous Effects of the Invention

As is described above, according to the present invention, the effect is obtained that it is possible to provide a wireless seatbelt attaching detection device that makes it possible to reduce the probability of radio wave collision.

DESCRIPTION OF THE EMBODIMENTS

Figure 1:
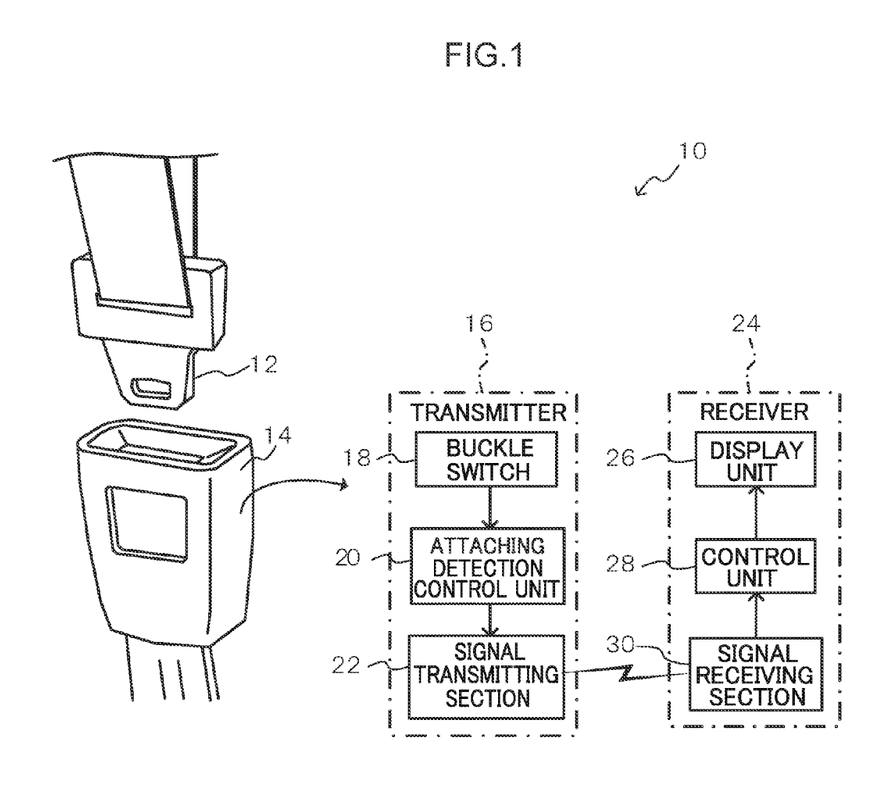
FIG. 1 is a view showing the schematic structure of a seatbelt attaching detection device according to an exemplary embodiment of the present invention.

Hereinafter, an example of an exemplary embodiment of the present invention will be described in detail with reference made to the drawings. FIG. 1 is a view showing the schematic structure of a wireless seatbelt attaching detection device according to an exemplary embodiment of the present invention.

In a wireless seatbelt attaching detection device 10 according to the present exemplary embodiment, a transmitter 16 is provided in a buckle 14 into which a tongue 12 of a seatbelt is inserted. Namely, because plural seatbelts equipped with a buckle 14 are provided in a vehicle so as to correspond to the number of vehicle seats, plural transmitters 16 is also provided so as to correspond to the seatbelt of each seat.

As is shown in FIG. 1, each transmitter 16 is formed so as to include a buckle switch 18, an attaching detection control unit 20, and a signal transmitting section 22.

The buckle switch 18 is a switch that is used to detect an insertion of the tongue 12 into the buckle 14, and an ejection of the tongue 12 from the buckle 14. Namely, the switch state of the buckle switch 18 is changed by an insertion of the tongue 12 into the buckle 14, or an ejection of the tongue 12 from the buckle 14. The buckle switch 18 is connected to the attaching detection control unit 20, and the attaching detection control unit 20 is notified as to the state of the buckle switch 18.

The attaching detection control unit 20 controls the signal transmitting section 22 such that the signal transmitting section 22 transmits a signal showing the state of the buckle switch 18, namely, that the tongue 12 is inserted in the buckle 14 or that the tongue 12 has been ejected from the buckle 14.

The signal transmitting section 22 transmits wireless signals in accordance with the control performed by the attaching detection control unit 20 as the signals showing that the tongue 12 is inserted in the buckle 14 or that the tongue 12 has been ejected from the buckle 14.

Signals transmitted from the signal transmitting section 22 of the transmitter 16 are received by a receiver 24. The receiver 24 is provided, for example, in a vehicle body or vehicle seat or the like. As is shown in FIG. 1, the receiver 24 is formed so as to include a signal receiving section 30, a control unit 28, and a display unit 26.

The signal receiving section 30 receives signals from the signal transmitting section 22 showing an insertion of the tongue 12 into the buckle 14 or an ejection of the tongue 12 from the buckle 14, and sends notification to the control unit 28.

The control unit 28 controls the display unit 26 such that the display unit 26 provides a display in accordance with the attaching state of the seatbelt (i.e., a state showing an insertion of the tongue 12 into the buckle 14 or an ejection of the tongue 12 from the buckle 14) obtained from the signals received by the signal receiving section 30. The display unit 26 is provided, for example, in an instrument cluster or an instrument panel or the like, and when a seatbelt has not been attached, provides a display or the like urging that the seatbelt be attached. At this time, it is also possible for the control unit to perform control such that, if a seatbelt has not been attached, then a warning sound or the like is generated simultaneously with the display.

Figure 2:
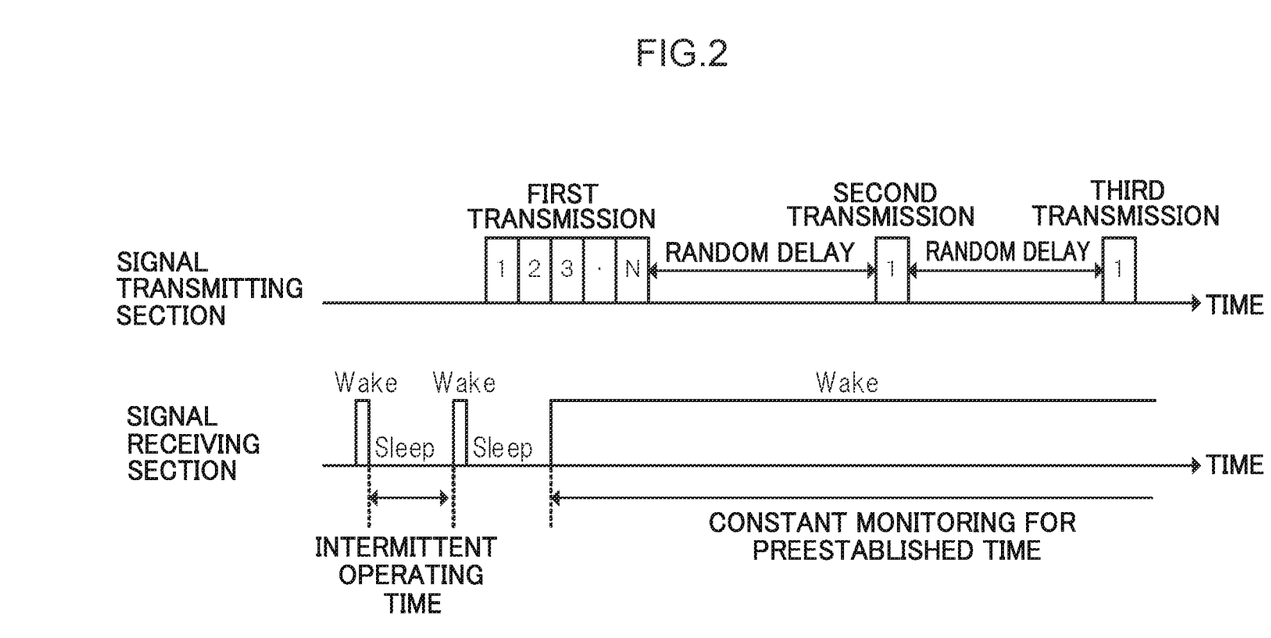
FIG. 2 is a view showing an example of a signal transmitted from a signal transmitting section of a transmitter and an example of an operation of a signal receiving section of the seatbelt attaching detection device according to the present exemplary embodiment.

Next, an example of a signal transmitted from the signal transmitting section 22 and of an operation of the signal receiving section 30 will be described. FIG. 2 is a view showing an example of a signal transmitted by the signal transmitting unit 22 of the transmitter 16 and an example of an operation of the signal receiving section 30 of the wireless seatbelt attaching detection device 10 according to the present exemplary embodiment.

When the state of the buckle switch 18 is changed by the insertion of the tongue 12 into the buckle 14 or the ejection of the tongue 12 from the buckle 14, the signal transmitting section 22 transmits a signal showing the state of the buckle switch 18.

As is shown in FIG. 2, as the transmitted signal, firstly, a long frame that is made up of plural frames (in FIG. 2, this is N number of frames) is transmitted, and then, after a random length of time has elapsed (i.e., after the random delay shown in FIG. 2), a short frame signal that is made up of a single frame is transmitted. Note that the transmission of a short frame after a random delay is performed plural times. One frame contains identifying information (known as ID) that is used to identify the buckle 14, and information showing the state of the buckle 14 and the like. Moreover, the short frames only need to be shorter frames than the long frame and, for example, it is also possible for only two frames to be provided as the short frames.

In order to reduce power consumption, the signal receiving section 30 repeatedly changes between a wake state (Wake in FIG. 2) and a sleep state (Sleep in FIG. 2) at predetermined intermittent operating times. If the signal receiving section 30 receives a signal from the signal transmitting section 22 during an intermittent wake time, the signal receiving section 30 reverts from the sleep state and transitions to the wake state. In this wake state, the signal receiving section 30 performs constant monitoring of signals for a preestablished length of time.

By transmitting and receiving signals in this way, because the signal receiving section 30 enters a constant monitoring mode when it receives a signal, the transmission of a frame becomes possible in the signal transmitting section 22. Accordingly, even if the transmission time is reduced, the probability that signals from the transmitters 16 corresponding to plural buckles 14 will collide with each other is reduced, and it is possible to improve the probability that communication with excellent responsiveness will be established. Moreover, because the constant monitoring time is a preestablished period, power consumption can be reduced and the battery can be prevented from going flat.

However, if a tongue 12 is consecutively attached to or detached from a buckle 14, there may be instances when a signal transmitted from the signal transmitting section 22 provided in another buckle 14 cannot be received.

Figure 3:
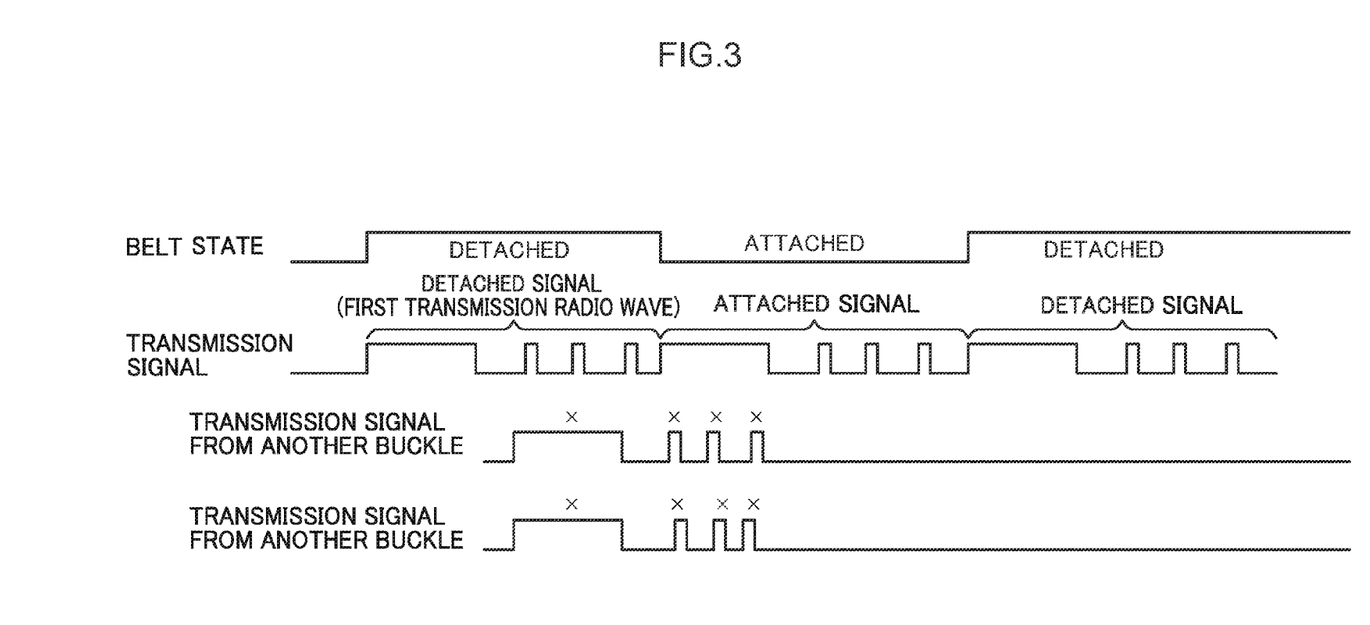
FIG. 3 is a view showing an example of a case in which it is not possible for a receiver to receive a signal transmitted from a signal transmitting section of another buckle when the ejection of a tongue from a buckle and the insertion of a tongue into a buckle are performed consecutively.

For example, as is shown in FIG. 3, if, after the tongue 12 has been ejected from the buckle 14 (as shown by the 'detached' for the belt state in FIG. 3), the tongue 12 is then subsequently inserted in the buckle 14 (as shown by the 'attached' for the belt state in FIG. 3), then as is shown by the x symbols in FIG. 3, in some instances the signals transmitted from the signal transmitting sections 22 of other buckles 14 cannot be received by the receiver 24 due to radio wave interference. Moreover, in the same way, if, after the tongue 12 was inserted into the buckle 14, the tongue 12 is then subsequently ejected from the buckle 14, then in some instances the signals transmitted from the signal transmitting sections 22 of other buckles 14 cannot be received by the receiver 24 due to radio wave interference. Note that, in FIG. 3, an example is shown in which the signals transmitted from the signal transmitting sections 22 of other buckles 14 cannot be received by the receiver 24 when the ejection of the tongue 12 from the buckle 14 and the insertion of the tongue 12 into the buckle 14 are performed consecutively.

Therefore, in the present exemplary embodiment, in cases when the state of the buckle switch 18 is changed consecutively within a predetermined time due to the attaching or detaching of the tongue 12 in the buckle 14, a different signal from the normal signal (i.e., the signal shown in FIG. 2) is transmitted. Namely, the transmitter 16 transmits different signals in accordance with the attaching/detaching time of the tongue 12 in the buckle 14. Note that, in the present exemplary embodiment, the 'attaching/detaching time' referred to here indicates at least one of a first time lasting from an ejection of the tongue 12 from the buckle 14 to an insertion of the tongue 12 in the buckle 14, and a second time lasting from an insertion of the tongue 12 in the buckle 14 to an ejection of the tongue 12 from the buckle 14.

Figure 4:
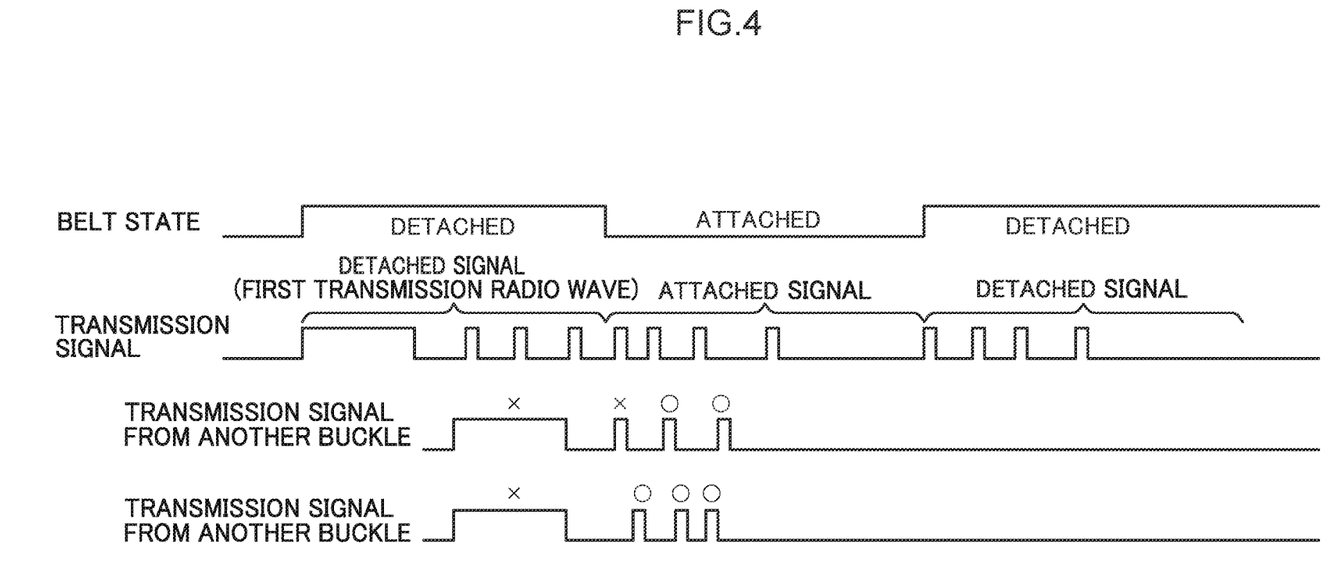
FIG. 4 is a view showing an example of a signal transmitted from a transmitter of a wireless seatbelt attaching detection device according to the present exemplary embodiment.

Specifically, in the present exemplary embodiment, as is shown in FIG. 4, when the state of the buckle switch 18 changes consecutively within a predetermined time, the attaching detection control unit 20 controls the signal transmitting section 22 such that the long frame made up of plural frames is omitted, and only short frames are transmitted. Namely, as a result of the long frame being omitted, the time when the signal receiving section 30 is in operation decreases. Because of this, the probability of radio wave interference occurring is reduced, and the probability that signals from other buckles 14 will be able to be received increases. Note that FIG. 4 shows an example of a signal transmitted from the transmitter 16 of the wireless seatbelt attaching detection device 10 according to the present exemplary embodiment.

Figure 5:
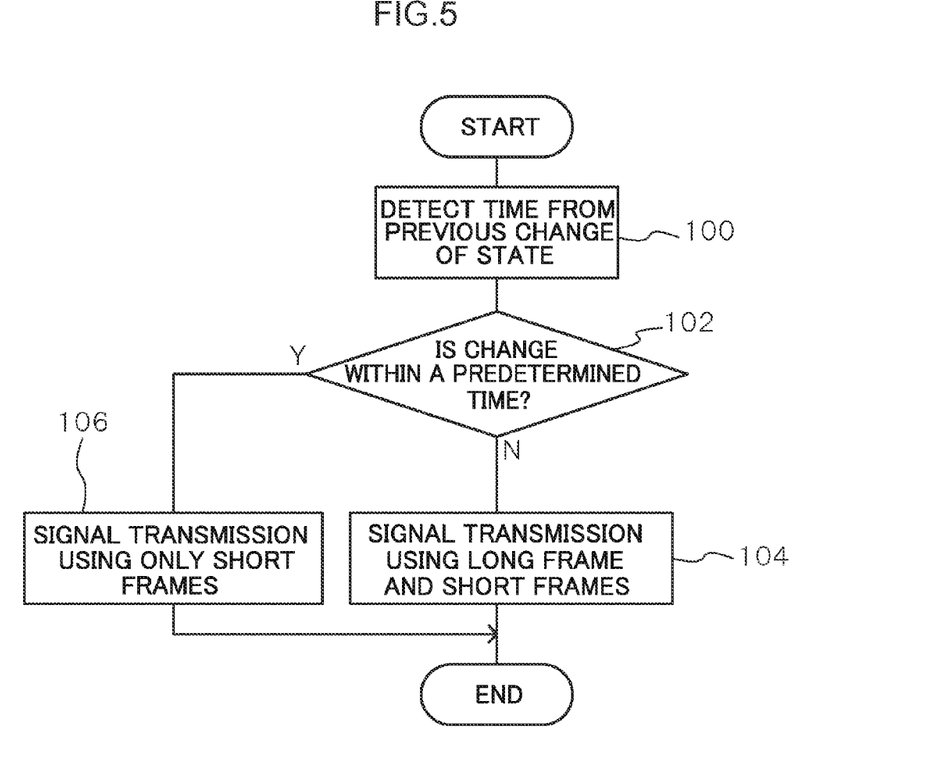
FIG. 5 is a flowchart showing an example of a processing flow performed by an attaching detection control unit of a transmitter of the wireless seatbelt attaching detection device according to the present exemplary embodiment.

Next, specific processing performed by the transmitter 16 of the wireless seatbelt attaching detection device 10 according to the present exemplary embodiment which has the above-described structure will be described. FIG. 5 is a flowchart showing an example of a processing flow performed by the attaching detection control unit 20 of the transmitter 16 of the wireless seatbelt attaching detection device 10 according to the present exemplary embodiment. Note that the processing shown in FIG. 5 is started when the state of the buckle switch 18 changes (i.e., when an insertion of the tongue 12 into the buckle 14 or an ejection of the tongue 12 from the buckle 14 has occurred).

When the attaching detection control unit 20 detects that the state of the buckle switch 18 has changed as a result of an insertion of the tongue 12 into the buckle 14 or an ejection of the tongue 12 from the buckle 14 having taken place, in step 100, the time from the previous change of state of the buckle switch 18 is detected and the routine moves to step 102. The attaching detection control unit 20 measures the time, for example, by using a timer that measures at least one attaching/detaching time out of the first time lasting from the ejection of the tongue 12 from the buckle 14 to the insertion of the tongue 12 in the buckle 14, and the second time lasting from the insertion of the tongue 12 in the buckle 14 to the ejection of the tongue 12 from the buckle 14.

In step 104, whether or not the change of state of the buckle switch 18 is a change within a predetermined time is determined by the attaching detection control unit 20. If the result of this determination is negative, the routine moves to step 104, while if the result is positive, the routine moves to step 106.

In step 104, as is shown in FIG. 2, the signal transmitting section 22 is controlled by the attaching detection control unit 20 such that the signal transmitting section 20 transmits a signal having a long frame made up of plural frames, and a short frame made up of a single frame, and the processing routine is then ended.

In contrast, as is shown in FIG. 4, in step 106, the signal transmitting section 22 is controlled by the attaching detection control unit 20 such that the signal transmitting section 22 transmits a signal using only short frames made up of a single frame, and the processing routine is then ended. As a consequence, as is described above, the probability of radio wave interference from signals from other buckles 14 occurring is reduced, and the probability that signals from other buckles 14 will be able to be received increases.

Note that, in the above-described exemplary embodiment, an example is described in which if the state of the buckle switch 18 changes consecutively (i.e., if the attaching/detaching time is within a predetermined time), then a signal made up of only short frames is transmitted, while at other normal times, a signal made up of a long frame and short frames is transmitted, however, the present invention is not limited to this.

Figure 6A:
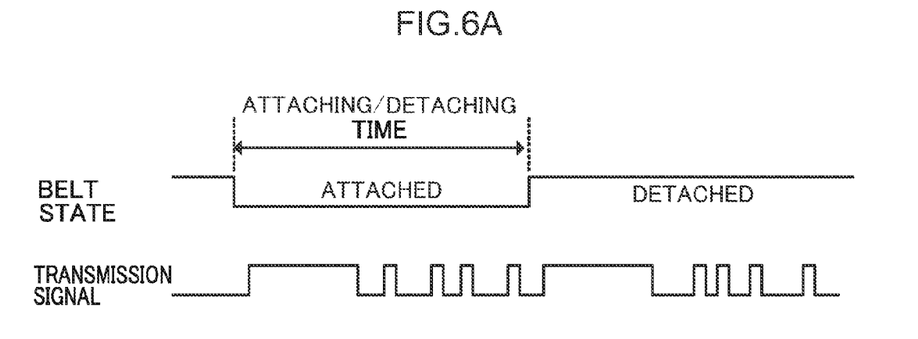
FIG. 6A is a view showing an example in which a signal made up of a long frame and plural short frames is transmitted when a seatbelt attaching/detaching time is equal to or longer than a predetermined time.
Figure 6B:
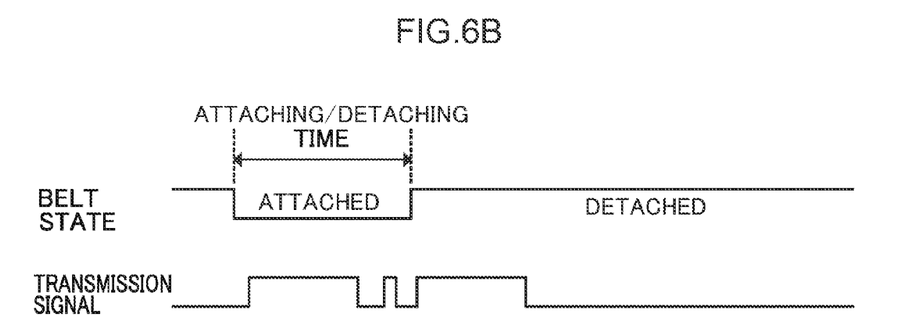
FIG. 6B is a view showing an example in which a signal in which the number of short frame retry attempts has been reduced is transmitted when a seatbelt attaching/detaching time is shorter than a predetermined time.

For example, if the buckles 14 are registered on a vehicle assembly line (i.e., if the transmitter 16 corresponding to the receiver 24 is registered), then it is necessary to prevent radio wave interference. Namely, it is necessary to register the next buckle 14 after waiting until the signal transmission has been completed, so that registering all the buckles 14 requires a considerable length of time. Therefore, if the seatbelt attaching/detaching time (i.e., the period from the insertion of the tongue 12 into the buckle 14 until the ejection of the tongue 12 from the buckle 14) is equal to or longer than a predetermined time, as is shown in FIG. 6A, in the same way as in FIG. 2, a normal signal that includes a long frame and plural short frames is transmitted. If, on the other hand, the seatbelt attaching/detaching time (i.e., the period from the insertion of the tongue 12 into the buckle 14 until the ejection of the tongue 12 from the buckle 14) is shorter than a predetermined time, then as is shown in FIG. 6B, it is possible to determine that the buckle 14 is registered, and to transmit a signal in which the number of short frame retry attempts has been reduced compared to a normal signal (for example, a signal in which there is only one short frame, or a signal from which short frames have been omitted, or the like). As a consequence, it is possible to reduce the buckle 14 registration time while keeping radio wave interference suppressed. Here, it is also possible when reducing the number of short frame retry attempts to reduce the number of retry attempts as the time from the insertion of the tongue 12 into the buckle 14 until the ejection of the tongue 12 from the buckle 14 becomes shorter. Alternatively, if the state of the buckle switch 18 changes consecutively not just during registration of the buckles 14 (i.e., if the attaching/detaching time is within a predetermined time), then it is also possible for a signal in which the number of short frame retry attempts has been reduced or omitted completely to be transmitted, and at other normal times, for a signal made up of a long frame and a predetermined number of retry attempt short frames to be transmitted.

Moreover, it is also possible to respectively determine one predetermined time that is used to determine consecutive detaching and attaching of a seatbelt during normal use, and another predetermined time that is used to determine the above-described registration, which is shorter than the one predetermined time. By determining different times as the predetermined times that are used for each determination, it is possible to perform control to transmit different signals for normal use periods and registration periods. Here, the wake time of the receiver 24 is determined such that the receiver 24 transits to a sleep state after a fixed time has elapsed since the last signal was received. Accordingly, provided that the receiver 24 is awake, then short frames can be received, and the transmission of long frames can be omitted. Because of this, it is optimum if the predetermined times for consecutive detaching and attaching of a seatbelt during normal use are made the same as the aforementioned fixed time.

Moreover, in the above-described exemplary embodiment, as is shown in FIG. 2, an example is described in which, in the signal transmitted by the transmitter 16, both long frames and short frames are transmitted at the same signal strength, however, it is not necessary for the signal strength to be the same.

Figure 7:
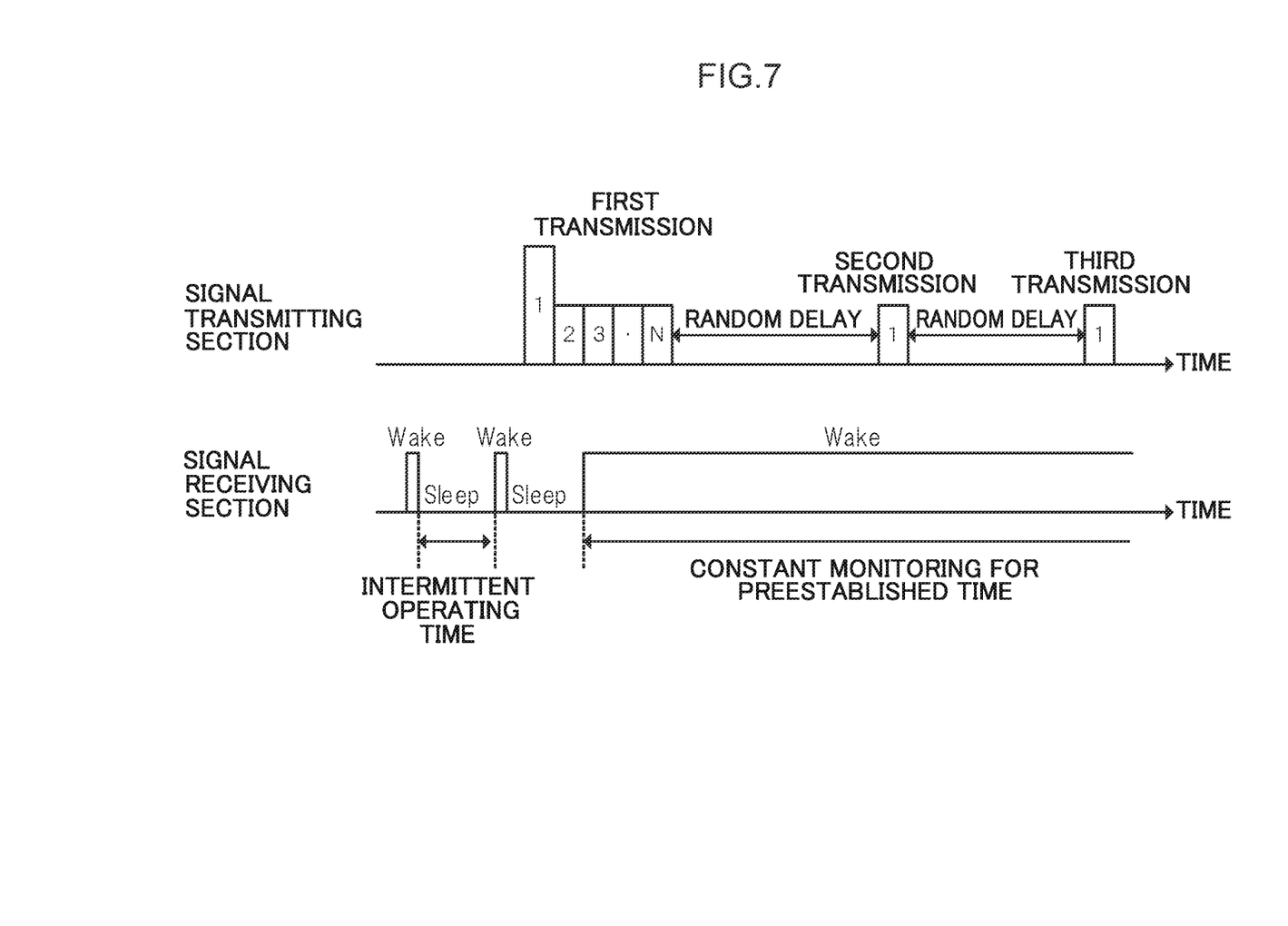
FIG. 7 is a view showing a signal in which the signal strength of the first frame of a long frame is greater than that of other frames.
Figure 8:
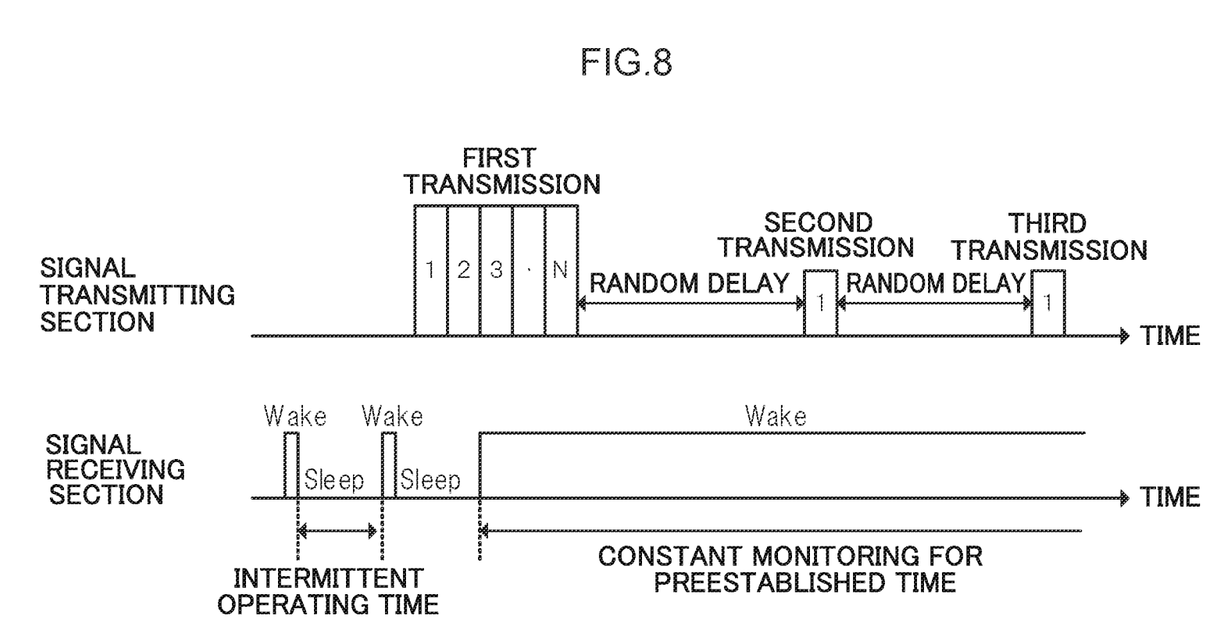
FIG. 8 is a view showing a signal in which the signal strength of a long frame is greater than that of a short frame.

For example, as is shown in FIG. 7, it is also possible to transmit a signal in which the one frame at the start of a long frame has a greater signal strength than the other frames. Alternatively, as is shown in FIG. 8, it is also possible for the signal strength of the long frame to be greater than that of the short frames. Alternatively, instead of the one frame at the start of a long frame, it is possible to make the signal strength of another frame or of plural frames greater than that of the other frames. In this way, by transmitting frames having different signal strengths, signals having a higher signal strength are received preferentially by the receiver 24, so that even if radio wave interference does arise, these signals are still easily received.

Figure 9:
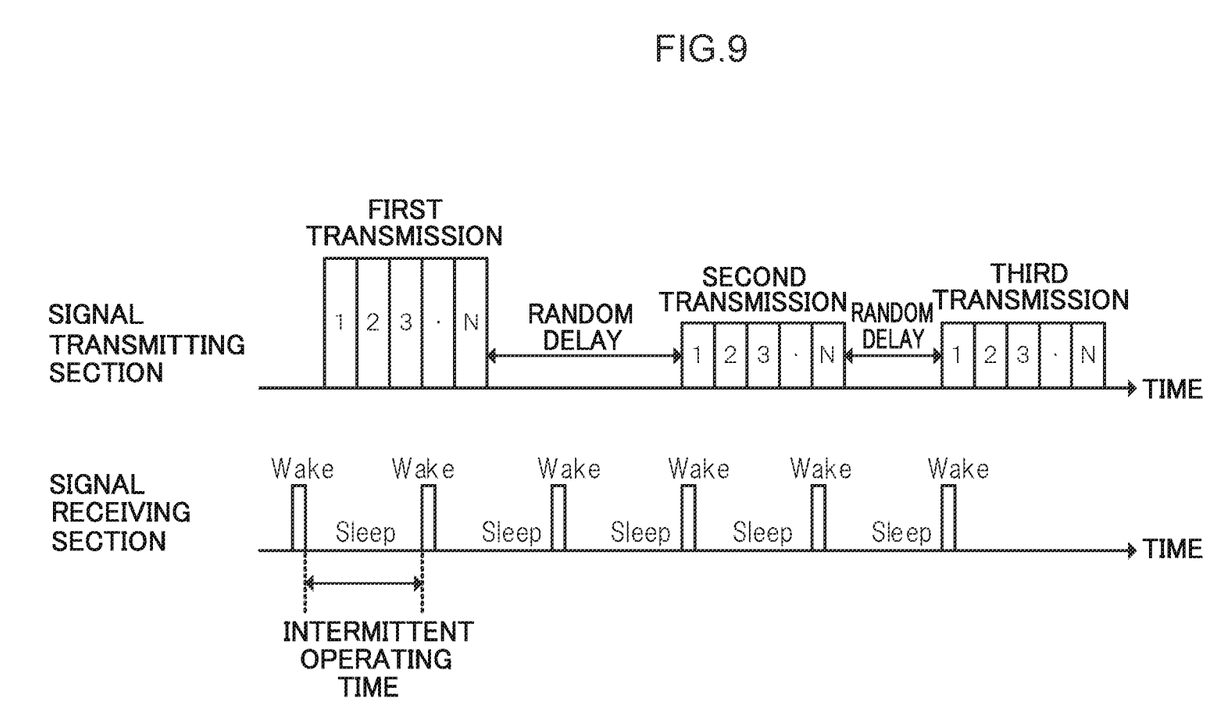
FIG. 9 is a view showing a signal in which plural long frames are provided, and the signal strength of the first long frame is greater than that of the other long frames.

Moreover, if, as is described above, the signal strengths are varied, then as is shown in FIG. 9, it is also possible for plural long frames to be transmitted instead of short frames in the signals transmitted from the signal transmitting section 22, and for the signal strength of the leading frame to be made greater than that of the other frames. In this case, as is shown in FIG. 9, the receiver 24 can be set to wake and to sleep at predetermined intermittent operating intervals, and can receive signals during wake periods. By doing this, because signals having a higher signal strength are received preferentially by the receiver 24 even if there is radio wave interference, the probability that signals will not be able to be received is reduced, and the probability of communication being established can be improved. Moreover, because the wake time of the receiver 24 is short, power consumption can also be reduced.

The present invention is not limited to the above-described exemplary embodiment and it is to be understood that various modifications and the like may be made thereto insofar as they do not depart from the spirit or scope of the present invention.

Priority is claimed on Japanese Patent Application No. 2014-211773, filed Oct. 16, 2014, the disclosure of which is incorporated herein by reference.

The invention claimed is:

1. A seat belt attaching detection device comprising:
    a detecting section that detects an insertion of a tongue into a buckle of a seatbelt and an ejection of the tongue from the buckle;
    a transmitting section that wirelessly transmits a signal showing detection results from the detecting section; and
    a control unit that controls the transmitting section such that the transmitting section transmits different signals that correspond to at least one attaching or detaching time out of a first time lasting from the ejection until the insertion and a second time lasting from the insertion until the ejection,
    wherein the control unit controls the transmitting section such that the transmitting section transmits signals whose lengths differ depending on whether the attaching or detaching time is shorter or longer than a predetermined time.

2. The seatbelt attaching detection device according to claim 1, wherein the control unit controls the transmitting section such that, when the attaching or detaching time is shorter than a predetermined time, the transmitting section transmits a shorter signal than when the attaching/detaching time is longer than the predetermined time.

3. The seatbelt attaching detection device according to claim 1, wherein the control unit controls the transmitting section such that, when the attaching or detaching time is equal to or greater than a predetermined time, the transmitting section transmits a normal signal that includes a long frame in which the frames that include information showing the detection results are continuous with each other, and a plurality of short frames which are shorter than the long frame, while when the attaching or detaching time is shorter than the predetermined time, the transmitting section transmits a signal that is made up of the normal signal from which the long frame has been omitted.

4. The seatbelt attaching detection device according to claim 1, wherein the control unit controls the transmitting section such that, when the second time is equal to or greater than a predetermined time, the transmitting section transmits a normal signal that includes a long frame in which a plurality of the frames that include information showing the detection results are continuous with each other, and a plurality of short frames which are shorter than the long frame, while when the second time is shorter than the predetermined time, the transmitting section transmits a signal having fewer shorter frames than the normal signal or from which the short frames have been omitted.

5. The seatbelt attaching detection device according to claim 1, wherein the control unit controls the transmitting section such that the transmitting section transmits a signal that is formed by a plurality of frames that include information showing the detection results, and includes frames in which the signal strength of at least one frame out of the plurality of frames is greater than the signal strength of the other frames.

* * * * *